United States Patent

Mori et al.

Patent Number: 5,157,444
Date of Patent: Oct. 20, 1992

[54] APPARATUS FOR CONTROLLING THE LATERAL SHIFTING OF AN ENDLESS BELT BY DETECTING BELT POSITION

[75] Inventors: Satoshi Mori, Yokohama; Yoshihiko Suzuki, Tokyo; Shokyo Koh, Yokohama, all of Japan

[73] Assignee: Canon Kabushiki Kaisha, Tokyo, Japan

[21] Appl. No.: 637,124

[22] Filed: Jan. 3, 1991

[30] Foreign Application Priority Data

Jan. 11, 1990 [JP] Japan .................. 2-003852
Jan. 11, 1990 [JP] Japan .................. 2-004083
Jan. 11, 1990 [JP] Japan .................. 2-004084

[51] Int. Cl.⁵ .................................. G03G 15/20
[52] U.S. Cl. .................... 355/282; 198/806; 198/810; 219/216; 355/285; 474/102
[58] Field of Search .............. 355/282, 284, 285, 289, 355/290, 295, 212; 219/216, 388; 198/806, 807, 810; 250/548, 561, 571; 474/102-108; 432/60

[56] References Cited

U.S. PATENT DOCUMENTS

| | | |
|---|---|---|
| 4,286,706 | 9/1981 | Castelli et al. .............. 198/806 |
| 4,344,693 | 8/1982 | Hamaker ...................... 355/212 |
| 4,385,716 | 5/1983 | De Roeck et al. .............. 226/18 |
| 4,404,572 | 9/1983 | Okamura et al. ............ 346/140 R |
| 4,429,985 | 2/1984 | Yokota ..................... 474/106 X |
| 4,462,676 | 7/1984 | Shimura et al. ............ 198/806 X |
| 4,483,607 | 11/1984 | Nagayama ................... 355/212 |
| 4,547,059 | 10/1985 | Nagayama et al. .......... 198/806 X |
| 4,565,439 | 1/1986 | Reynolds ................... 219/216 X |
| 4,959,040 | 9/1990 | Gardner et al. ............ 474/103 |
| 4,998,121 | 3/1991 | Koh et al. .................. 346/160 |
| 5,026,276 | 6/1991 | Hirabayashi et al. ........ 355/282 X |
| 5,027,160 | 6/1991 | Okada et al. ............... 355/282 |
| 5,043,763 | 8/1991 | Koh et al. ................. 355/285 X |
| 5,083,168 | 1/1992 | Kusaka et al. .............. 355/285 |
| 5,091,752 | 2/1992 | Okada ...................... 355/285 |

FOREIGN PATENT DOCUMENTS

| | | |
|---|---|---|
| 0287874 | 10/1988 | European Pat. Off. .......... 198/810 |
| 0171906 | 9/1985 | Japan ....................... 198/810 |
| 0178111 | 9/1985 | Japan ....................... 198/810 |

Primary Examiner—A. T. Grimley
Assistant Examiner—William J. Royer
Attorney, Agent, or Firm—Fitzpatrick, Cella, Harper & Scinto

[57] ABSTRACT

A lateral shift control apparatus for an endless belt includes a lateral shifting driver for applying to the endless belt a lateral shifting force in lateral directions; a switching device for switching direction of the lateral shifting force; a detector for detecting a lateral end position of the endless belt; and a controller responsive to an output of the detector to control the switching device. The lateral end portion detected by the detector is provided with an inclined portion.

53 Claims, 16 Drawing Sheets

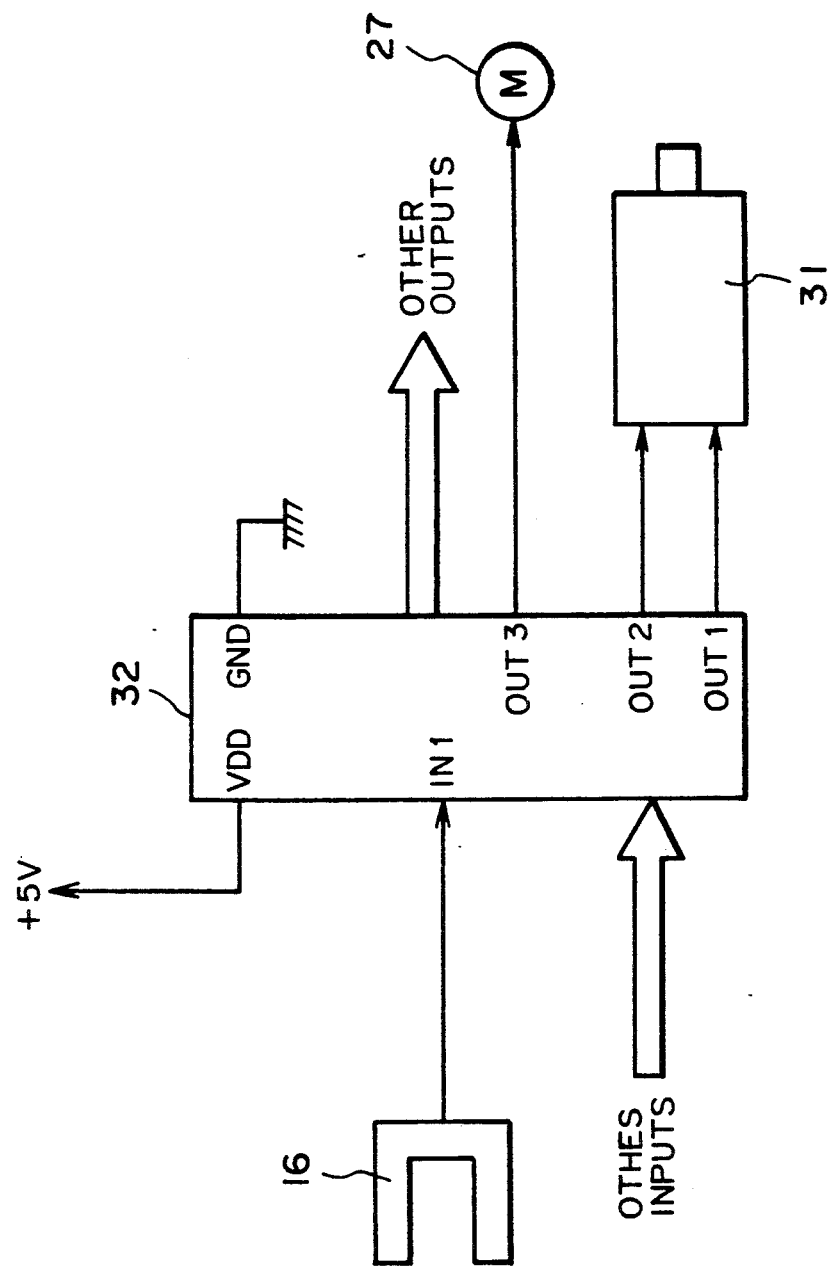

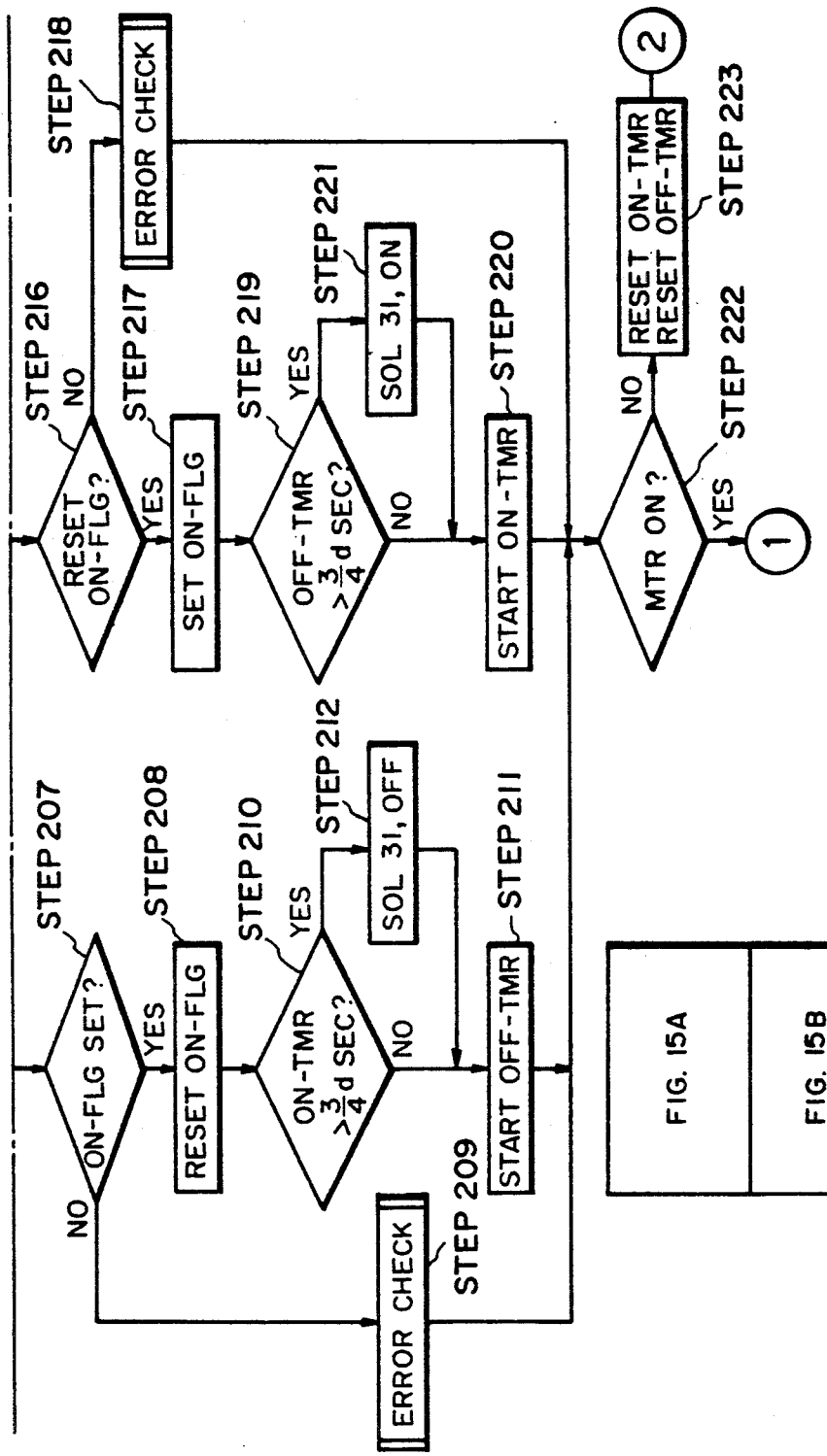

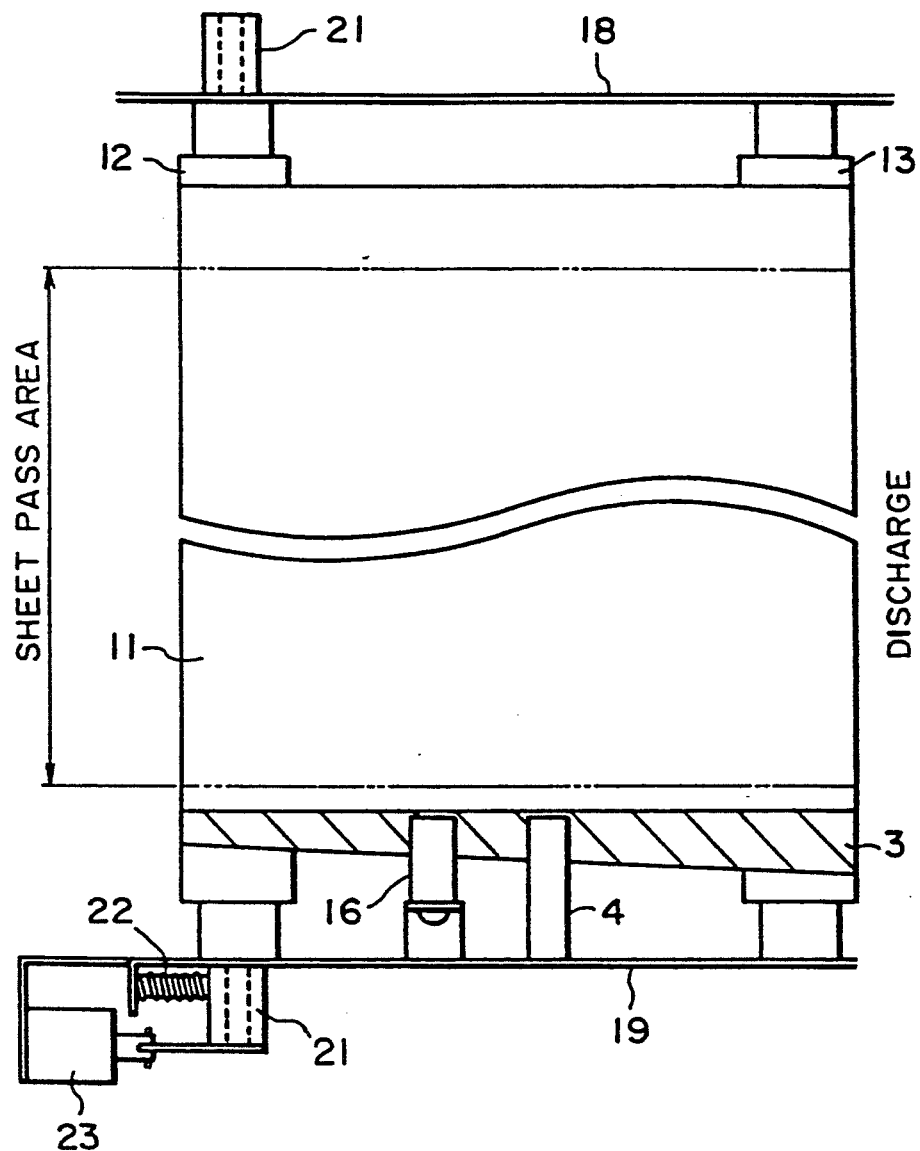
F I G. 16

APPARATUS FOR CONTROLLING THE LATERAL SHIFTING OF AN ENDLESS BELT BY DETECTING BELT POSITION

FIELD OF THE INVENTION AND RELATED ART

The present invention relates to an apparatus for controlling a lateral shift of an endless belt stretched and rotated around rollers more particularly to an image fixing apparatus using an endless belt.

The machines using an endless belt include an image fixing apparatus and a photosensitive belt, but an image fixing apparatus will be taken in this specification as a typical example. As for the image fixing apparatus, various structures have been proposed such as heat roller fixing system.

Recently, U.S. Pat. Nos. 5,043,763, 4,998,121, 5,026,276, 5,027,160 and 5,083,168 and U.S. Ser. Nos. 206,767, 435,247, 430,437, 440,380, 440,678, 444,802 which have been assigned to the assignee of this application have proposed an image fixing apparatus using a thin film endless belt, wherein the waiting period is reduced.

When an endless belt is used, the belt might shift during its rotation along an axis of the rotation (lateral shift). The lateral shift is caused by the mechanical inaccuracy in the parallelism or twisting between two or more endless belt stretching members such as rollers. However, the improvement of the mechanical accuracy is limited, and therefore, it is difficult to eliminate the lateral shift of the endless belt by increasing the mechanical accuracy.

To solve this problem it has been considered to forcedly restrict the lateral shift using ribs or the like. However, if the endless belt film has a very small thickness, in order to reduce the thermal capacity thereof, the mechanical lateral shift confinement would result in creasing of the film.

Therefore, as proposed in U.S Pat. No. 5,027,160 it is preferable to detect the lateral shift by a sensor, and the lateral shifting direction is deliberately changed on the basis of the output of the sensor, by, for example displacing an axis of a tension roller, thus laterally reciprocating the endless belt within a predetermined range.

However, in order to switch the lateral shifting direction of the endless belt, the lateral position of the endless belt has to be detected at least at two positions. Therefore, plural position detecting sensor are required. In addition, if a malfunction of the lateral, shifting mechanism occurs, the endless belt deviate beyond the predetermined range. In order to detect such an abnormal position, the number of position sensors will be further increased.

SUMMARY OF THE INVENTION

Accordingly, it is an object of the present invention to provide a lateral shift control apparatus for an endless belt wherein one position sensor is sufficient to detect plural positions of the endless belt.

It is another object of the present invention to provide a lateral shift control apparatus for an endless belt wherein one position sensor is effective to detect a position where the endless belt reverses, and an abnormal position.

It is a further object of the present invention to provide a lateral shift control apparatus for an endless belt having an inclined portion at one lateral end of the endless belt.

It is a further object of the present invention to provide an image fixing apparatus using a fixing film in the form of an endless belt, wherein the endless belt is not damaged.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 14 shows an electric control according to a further embodiment.

FIG. 15, comprising FIGS. 15A and 15B, is a flow chart of a lateral shift control according to the embodiment.

FIG. 16 is a top plan view of an image fixing apparatus according to a further embodiment of the present invention.

DESCRIPTION OF THE PREFERRED EMBODIMENTS

Embodiments of the present invention will be described in conjunction with the accompanying drawings Referring to FIG. 1, there is shown an image fixing apparatus using an endless film provided with a lateral control system according to an embodiment of the present invention. FIG. 2 is a side view of the apparatus, and FIG. 3 is a sectional view of an image forming apparatus incorporating the fixing apparatus of FIG. 1.

Figure 3:
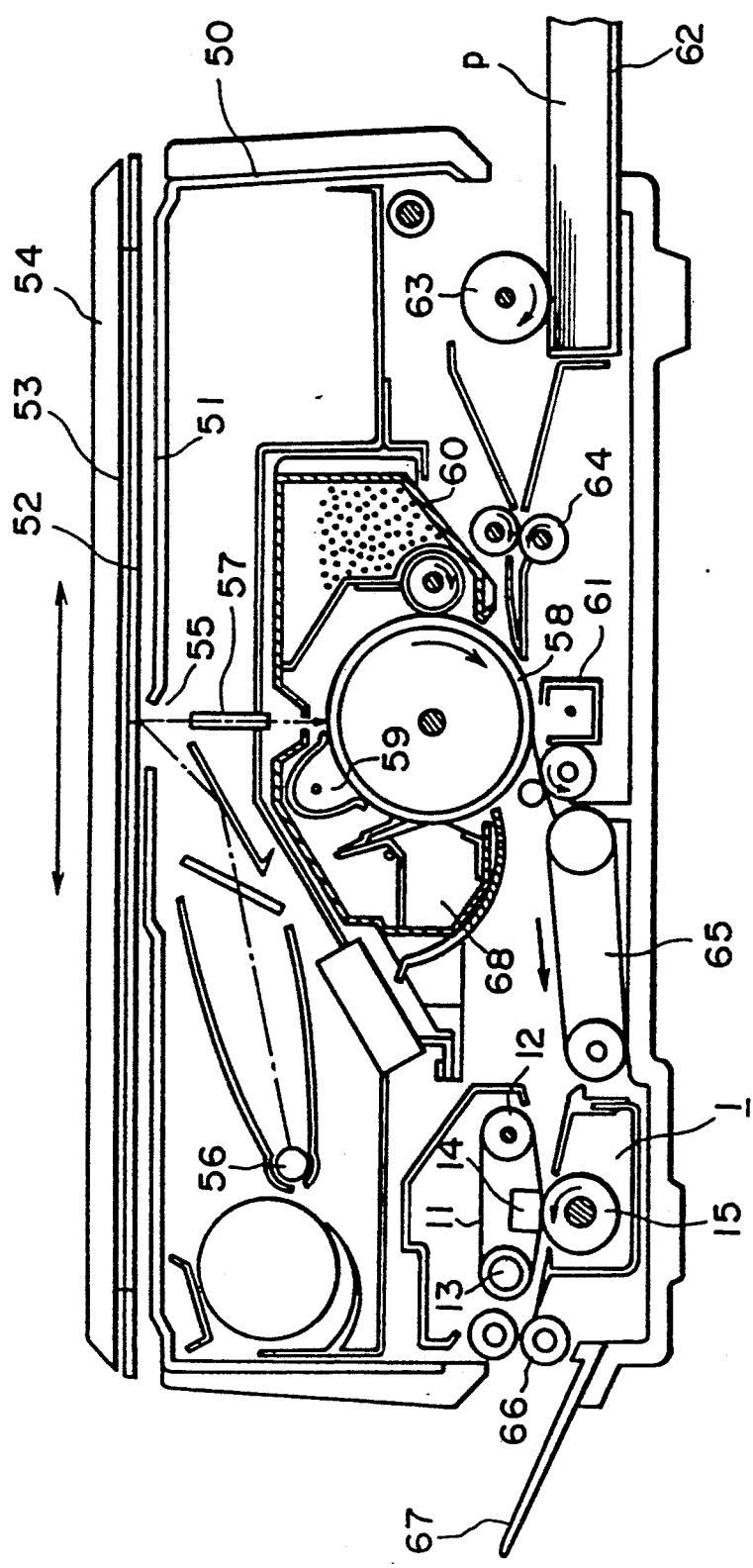
FIG. 3 is a sectional view of an image forming apparatus using an image fixing apparatus shown in FIGS. 1 and 2.

Referring to first FIG. 3, a description will be provided as to an image forming apparatus of an electrophotographic type. The image forming apparatus comprises a reciprocable original supporting platen 52 in a top plate 51 of the casing 50. The original supporting platen is reciprocated through an unshown driving mechanism. An original 53 to be copied is placed down on the top surface of the original supporting plate 52, and is set thereon by an original covering plate 54.

The surface of the original 53 facing downward is illuminated through a slit by an illumination system 55 in a forward o backward stroke of the original supporting platen 52. Designated by a reference numeral 56 is in illuminating light source.

The light reflected by the original is sequentially imaged on a surface of a photosensitive drum 58 through an imaging lens (short focus imaging element array) 57, the photosensitive drum rotating in synchronism with the scanning of the original image.

The photosensitive drum 58 is uniformly charged to a positive or negative polarity by a discharger 59, and then is exposed to the image light, so that an electrostatic latent image is sequentially formed on the peripheral surface of the drum in accordance with the original image.

The surface of the photosensitive drum 58 now having the latent image is developed by a developing device 60 with powdery toner.

The developed image on the photosensitive drum 58 reaches the position of the transfer discharger 61 with continued rotation of the drum.

On the other hand, a recording material P is fed from a recording material cassette 62 into the copying machine by a pick-up roller 63, and is stopped by a nip formed between registration rollers 64 which are at this time not rotating. At a predetermined time in synchronism with rotation of the photosensitive drum 58, the registration rollers 64 start to rotate, by which the recording material P is fed toward the photosensitive drum 58 along the guiding members. It is introduced into the image transfer position between the photosensitive drum 58 and the transfer discharger 61, by which the developed image on the photosensitive drum 58 is sequentially transferred onto the recording material P.

The recording material P now having the transferred image is separated from the surface of the photosensitive drum 58 by an unshown separating means and is then introduced by a conveying system 65 into an image-fixing apparatus 1 where it is subjected to an image fixing operation. Finally, it is discharged onto an outside discharge tray 67 by discharging roller 66.

The surface of the photosensitive drum 58 after the image transfer is cleaned by a cleaning device 68.

The image forming apparatus is openable into top and bottom units with the boundary which is substantially the same as the recording material conveying path, and when the apparatus is opened or when a jam occurs, a main switch is opened. If the apparatus is closed after the maintenance or jam clearance operation, the main switch is closed.

A description will now be provided as to the fixing apparatus 1. In FIGS. 1 and 2, an endless film driving roller 13 and a follower roller 12 functioning also as a tension roller are extended parallel to each other. An endless film 11 is stretched around the rollers 13 and 12. The driving roller 13 is driven by a driving system including a driving motor 27 in a clockwise direction indicated by an arrow, by which the endless film 11 is rotated in the clockwise direction at a predetermined peripheral speed.

The film 11 has a total thickness of 100 microns, preferably not less than 40 microns and has heat durability. It comprises, in this embodiment, a base film having a thickness of approximately 20 microns and made of PI (polyimide), PEI (polyether imide), PES (polyether sulfide), PFA (perfluoroalkoxy) or the like and a parting layer of PTFE (polytetrafluoroethylene) at an image contacting side, the parting layer having a thickness of approximately 10 microns.

A heater 14 is fixed on a frame of the image fixing apparatus in contact with an inside of a bottom travel of the endless film 11. The heater 14 is elongated or linear extended in a direction crossing a direction of movement of the film 11. The heater is supplied with electric power to generate heat.

A pressing roller 15 has a rubber elastic layer made of silicone rubber or the like having a good parting property. The pressing roller 15 is urged to the bottom travel of the endless film 11 toward the heater 14 by an unshown urging means with a total pressure of 4-5 kg. The pressing roller rotates together with the movement of the film and at the same peripheral speed as the film in the same direction.

A recording material P carrying an unfixed toner image t (heat-fusible toner image) is carried from the transfer position 61 (FIG. 3) to the fixing apparatus 1 by conveying means 65. The recording material P is introduced into the nip (fixing nip) formed between the endless film 11 and the pressing roller. Then, it is moved in close contact with the fixing film 11 surface which moves at the same speed as the recording material P During the passage through the nip, the toner image on the recording material P is heated by the heat from the heater 14 through the film, by which at least the surface region of the toner image t is completely softened and fused to, as to be heat-fixed on the recording material P surface. The recording material P having passed through the fixing nip N is then separated from the surface of the film 11 by the curvature of the film along the roller 13, when the recording sheet passes by the film driving roller 13.

A description will be provided as to the lateral shift control mechanism for the endless film. As shown in FIG. 1, the driving rollers 13 and the follower rollers 12 are supported by bearings in a front plate 19 and a rear plate 18 of the fixing apparatus 1. Designated by reference numerals 21 and 20 are bearings in the front and rear plates, respectively, of the follower roller 12.

Figure 1:
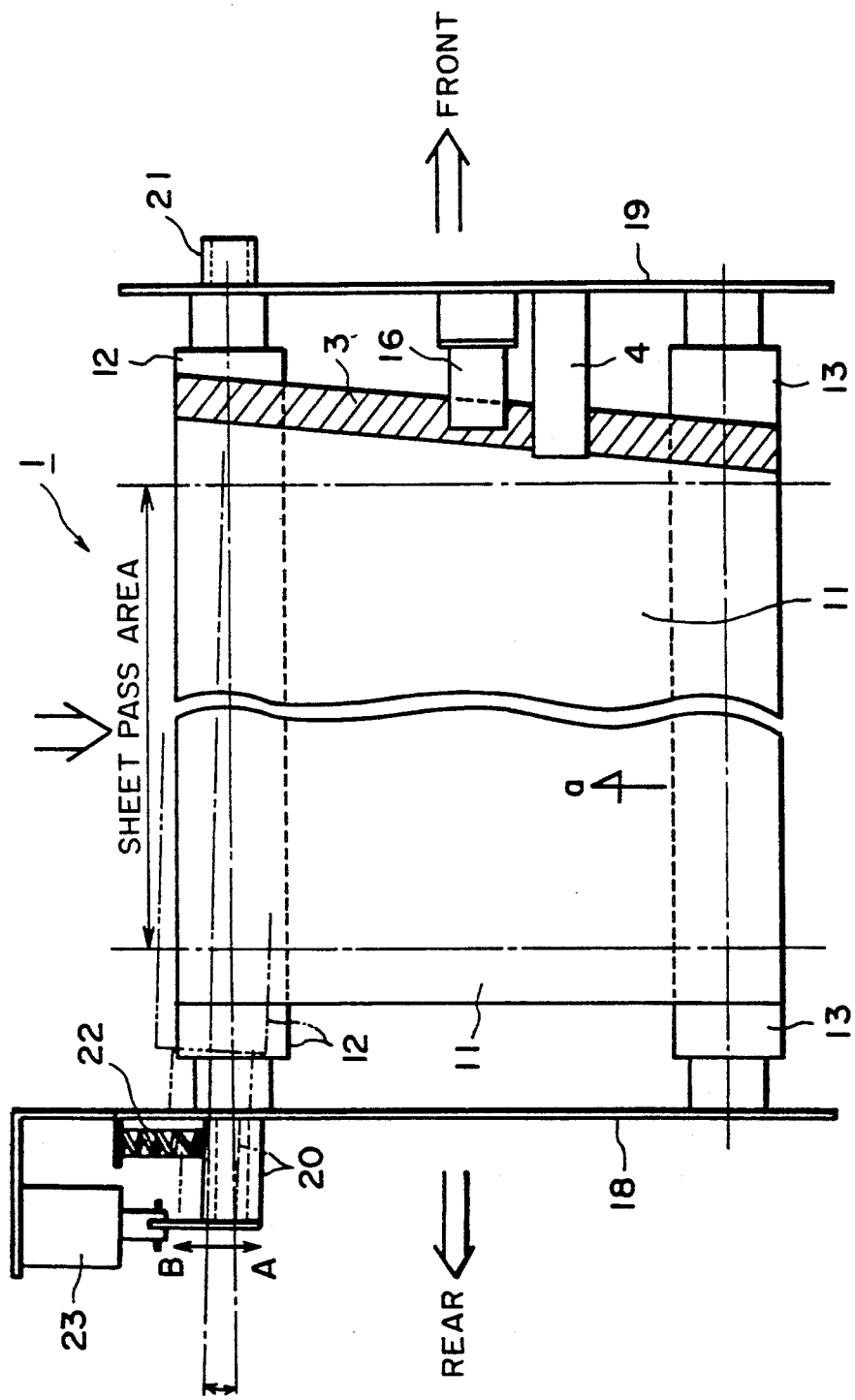
FIG. 1 is a partial top plan view of an image fixing apparatus using a lateral shift control for an endless belt, according to an embodiment of the present invention.
Figure 2:
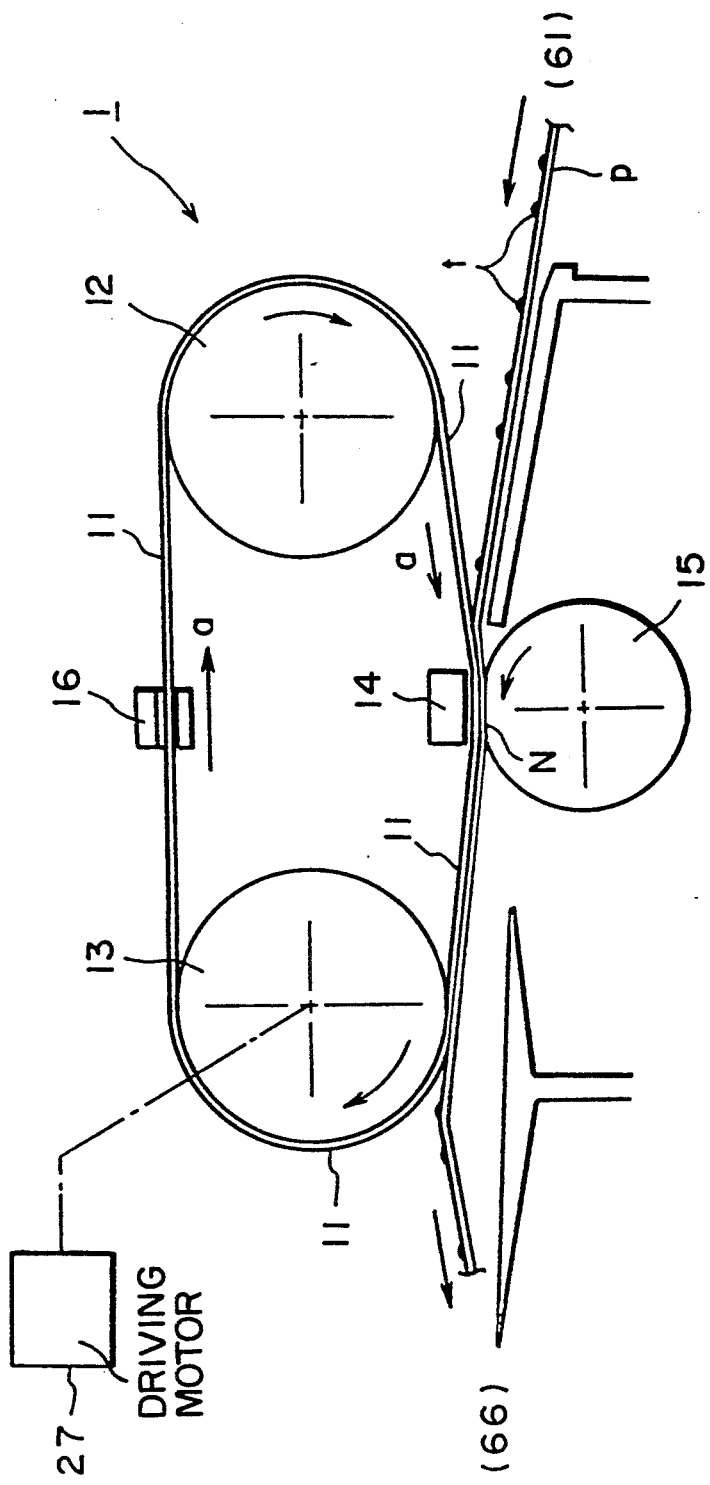
FIG. 2 is a side view of the apparatus of FIG. 1 embodiment.

When the driving roller 13 is driven to move the film 11 in the direction indicated by an arrow, the film laterally moves toward right or left from the initial position of the film 11 indicated by the solid lines in FIG. 1, to such an extent that a lateral end of the film is rubbed with the front or rear plate 18 or 19. The lateral shifting is attributable to the positional errors of the rollers 13 and 12 and the heater 14 in X, Y and Z axis directions. The lateral shifting is produced as long as the parallelism errors among the driving roller 13, the follower roller 12, the heater 14 and the pressing roller 15 in the X, Y and Z directions are not equal to zero.

In this embodiment, the bearing 20 of the follower roller 12 at the rear side is movable in the front-rear direction as indicated by arrows A and B relative to the plate 18. It is normally urged by a compression spring 22 in the direction A and is stopped by an unshown stopper at a first position. It is connected with a plunger of a solenoid 23 so that upon energization of the solenoid, the bearing 20 is moved in the direction B against the spring force of the compression spring 22 to be moved to the second position indicated by chain lines.

In this manner, by the energization and deenergization of the solenoid, the parallelism of the follower roller 12 is changed relative t the driving roller 13 and the heater 14.

In this embodiment, when the bearing 20 is at the first position (solenoid 23 is not energized), the film 11 tends to shift toward left in the film width direction when it travels around the members 13, 12 and 14, in other words, toward the rear side of the rollers 13 and 12. On the other hand, when the solenoid 23 is actuated so that the bearing 20 is at the second position indicated by chain lines, the film 11 tends to shift rightwardly, that is, toward the front side of the rollers 13 and 12.

A photosensor 16 detects the lateral shift of the film. As shown in FIG. 1, adjacent a front side lateral end of the film 11, a mask is provided around the circumference of the film to block the light of the photosensor 16, as indicated by hatching line.

In this embodiment, the photosensor 16 is of a photointerruptor type. If the photosensor 16 is of a reflection type, the end of the film 11 may be provided with reflection material.

In this embodiment, the masking is provided only at one lateral side of the film 11, but it may be formed over the entire film.

A cleaning member 4 cleans the lateral end portion of the film. If the end portion of the film is contaminated, there can be erroneous reading of the film position if the reflection type sensor is used, for example. To avoid this, the lateral end portion of the film is always cleaned. In this embodiment, the cleaning member is of felt, but it may be made of another material if it has a cleaning effect.

Figure 4:
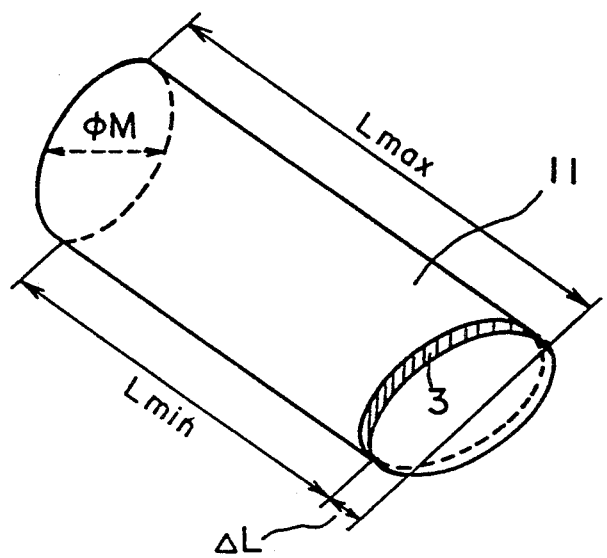
FIG. 4 is an external view of an endless film.

FIG. 4 shows an outer configuration of the film. As described hereinbefore, it is of an endless belt, and the diameter is $\phi M$. As shown in the figure, the film 11 is cut inclinedly at a lateral end (front side end). The maximum longitudinal length is Lmax and the minimum length is Lmin. Then, the inclined cut 3 of the film 11 has a dimension of $Lmax - Lmin = \Delta L$ (inclined cut). The inclined cut, as shown in FIG. 1, is disposed at the front side of the fixing apparatus to detect the position of the film 11 by the photosensor 16.

Figure 5:
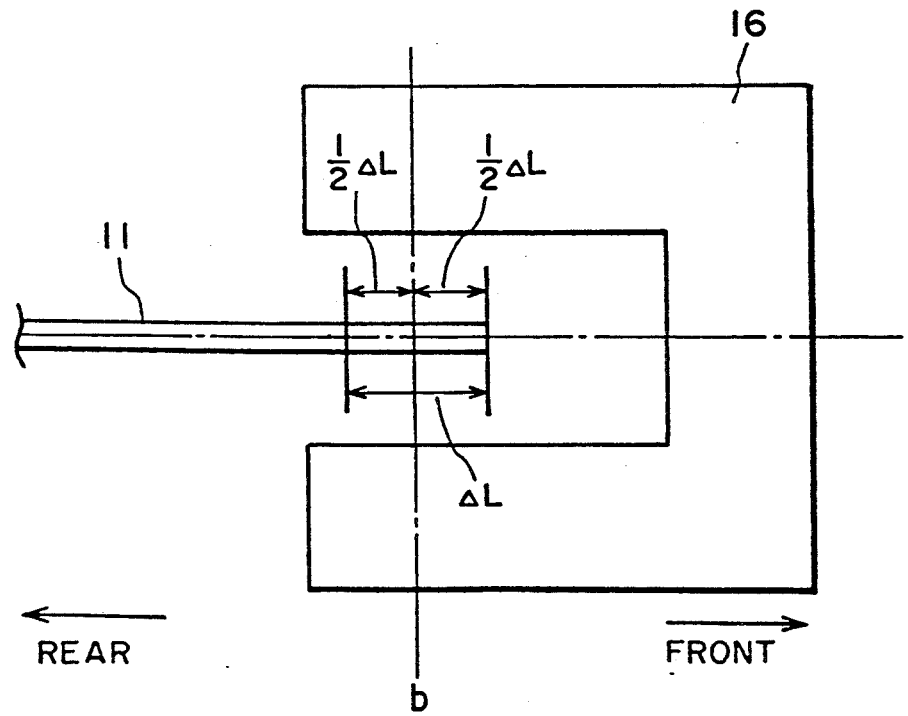
FIG. 5 shows a positional relation between a film sensor and a film position.

FIG. 5 shows in detail the positional relation between the photosensor 16 and the film 11. In this embodiment, the photosensor 16 is a transparent type, and the detecting position is indicated by a reference b. Then, if the position of the film 11 is rear beyond the position b, the photosensor 16 is actuated, and if it is at the front side beyond the position b, the photosensor 16 is not actuated. The inclined cut portion of the film 11 is at the detecting position b.

By such an arrangement, when the film 11 moves in the direction indicated by an arrow a shown in FIG. 1, the photosensor 16 repeats on and off. In addition, depending on the lateral shift amount of the film, the ratio of on-duration and off-duration (duty ratio) changes.

In FIG. 5, the film is shown as being positioned such that the center of the inclined cut of the film 11 is at the detecting position b of the photosensor (reference position).

Figure 6:
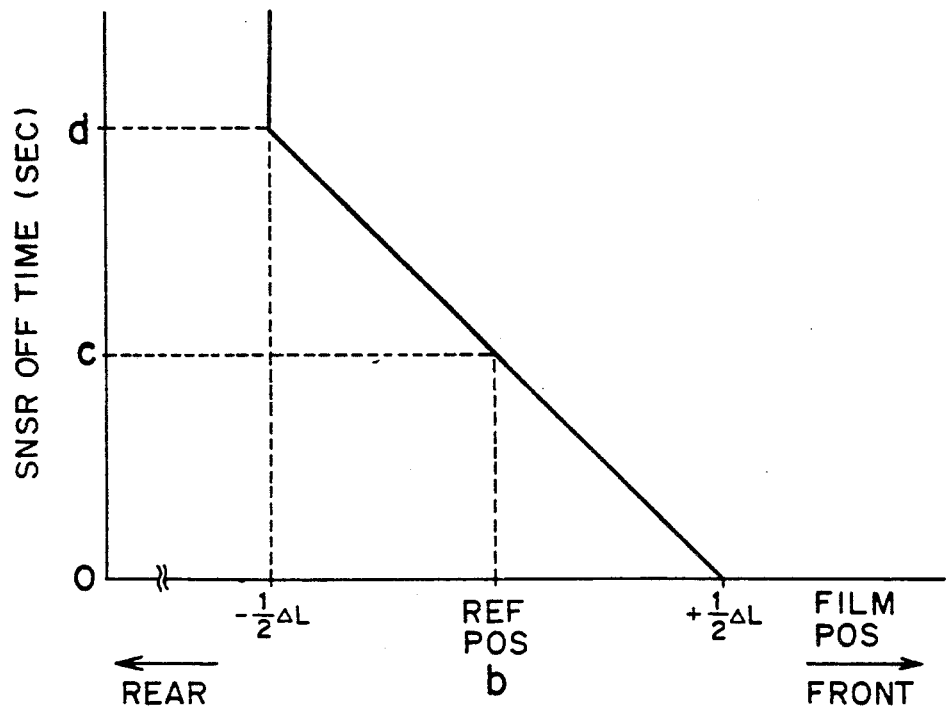
FIG. 6 is a graph showing a relation between a film position and a film sensor output.

FIG. 6 is a graph showing a relation between the film position and the off-duration of the photosensor 16 relative to the reference position. As will be understood from FIG. 6, when the film 11 is at the reference position b, the off-duration of the photosensor 16 is c sec. When the film 11 is deviated to the front beyond the reference position B by not less than $\Delta L/2$, the off duration of the photosensor 16 is 0 sec.

On the contrary, when the film 11 is laterally deviated toward the rear from the reference position by not less than $\Delta L/2$, the photosensor 16 continues to be off.

Immediately before the film 11 is deviated to such an extent that the photosensor 16 continues to be off, the off-duration is d sec. This is considered as being equivalent to the time period required for the film 11 to rotate through one full-turn. The off-duration c sec. is approximately one half the off-duration d sec. because it corresponds to the center of the inclined film cut.

With this arrangement, when the continuous off-duration of the photosensor 16 becomes longer than ($\frac{2}{3}$)d sec. which is shorter than d sec. and longer than d/2 sec., the solenoid 23 is started. On the other hand, when it becomes ($\frac{1}{3}$)d which is shorter than d/2 sec., the solenoid 23 is deenergized. The energization and the deenergization are repeated during the film drive operation.

Accordingly, the endless film reciprocates within, a predetermined range and does not laterally shift beyond the range.

Figure 7:
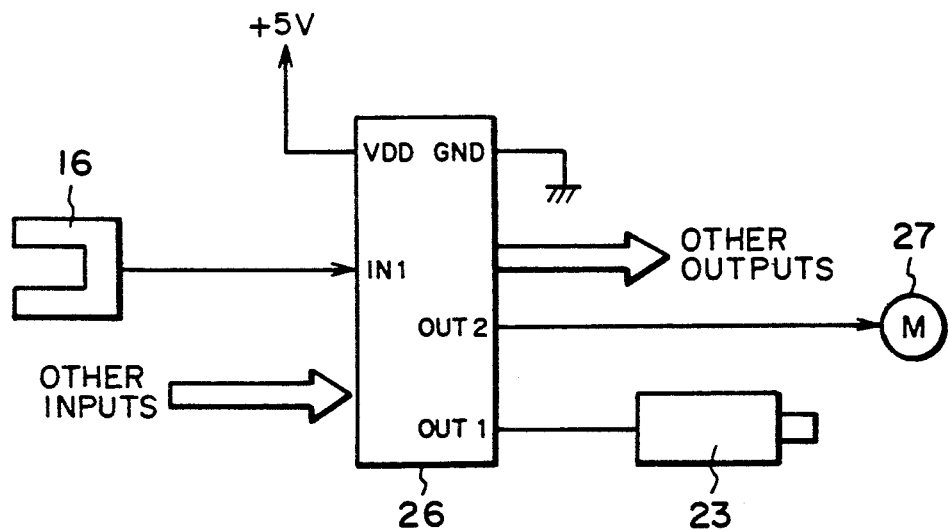
FIG. 7 schematically shows the electric control according to an embodiment of the present invention.

FIG. 7 shows the lateral shift control system. A microcomputer 26 has an input terminal IN1 to which the photosensor 16 is connected, and an output terminal OUT1 to which the solenoid 23 is connected. It also comprises an output terminal OUT2 from which a rotation control signal for the motor 27 for driving the fixing apparatus is produced.

To a VDD terminal, a +5 V voltage source is connected, and a GND terminal is electrically grounded.

Although not shown, it is also provided with terminals for receiving and producing signals to and from the copying machine using the fixing apparatus. The microcomputer 26 comprises ROM and RAM having a copying sequential operation program or the like and a non-volatile memory RAM which does not lose the contents of its memory even if the power supply to the microcomputer 26 is shut off due to the deactuation of the main switch of the apparatus, or due to the deactuation of the main switch by the opening of the apparatus as described hereinbefore.

Figure 8:
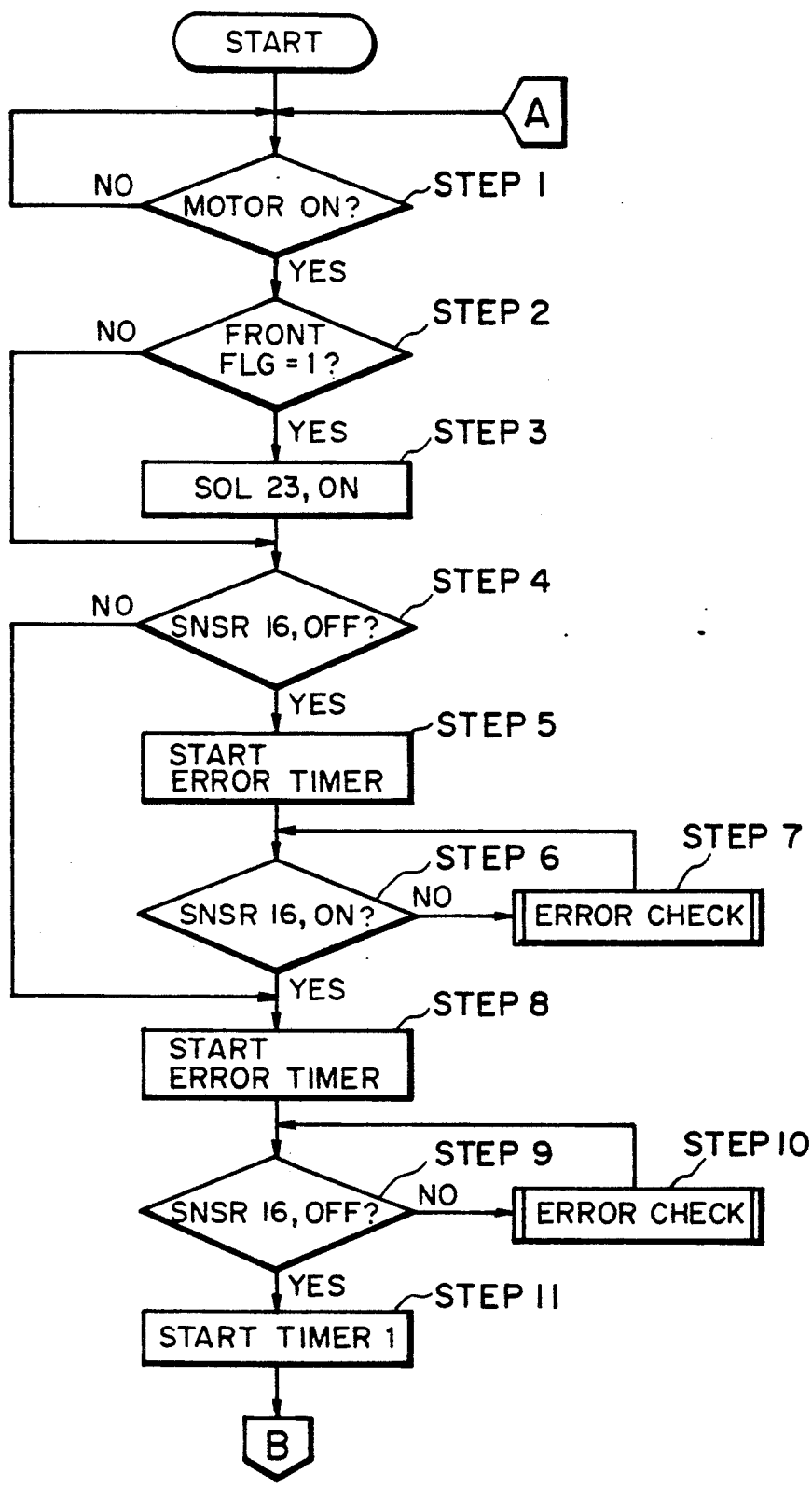
FIGS. 8, 9, 10 and 11 are flow charts illustrating lateral shift control according to the embodiment of the present invention.

FIGS. 8-11 are flow charts of the programmed film lateral shift control operations in the fixing apparatus of this embodiment. This program is also contained in the ROM of the microcomputer 26 this program is accessed by the main sequence program at regular intervals or as desired. After a start, the discrimination is made as to whether or not the motor 27 is actuated, at step 1 (FIG. 8). If so, step 2 is executed. If not, the operation returns to step 1 and waits for actuation of the motor 27.

At step 2, a discrimination is made as to whether the film lateral shift control has been effected toward the front side or not. In this embodiment, the memory in a predetermined address of the non-volatile RAM in the microcomputer 26 is set to the front side flag. The above discrimination is made using this, that is, if the memory is 1 which indicates that the past control is toward the front side, a step S3 is executed where the solenoid 23 is actuated, and the lateral shift is set to the front side. Then, the step 4 is executed. If, at step 2, the front side flag is zero, which indicates that the past control is toward the rear side, the step 4 is executed. At step 4, a discrimination is made as to whether or not the sensor is actuated. If the sensor 16 is actuated, step 8 is executed. If it is not actuated, step 5 is executed. At step 5, an error timer is reset to zero, and starts measurement, and thereafter, step S6 is executed.

At step 6, a discrimination is made as to whether the sensor 16 is actuated or not. If not, the operation proceeds to step 7.

At step 7, an error check routine is executed, and the operation returns to step 6.

Figure 9:
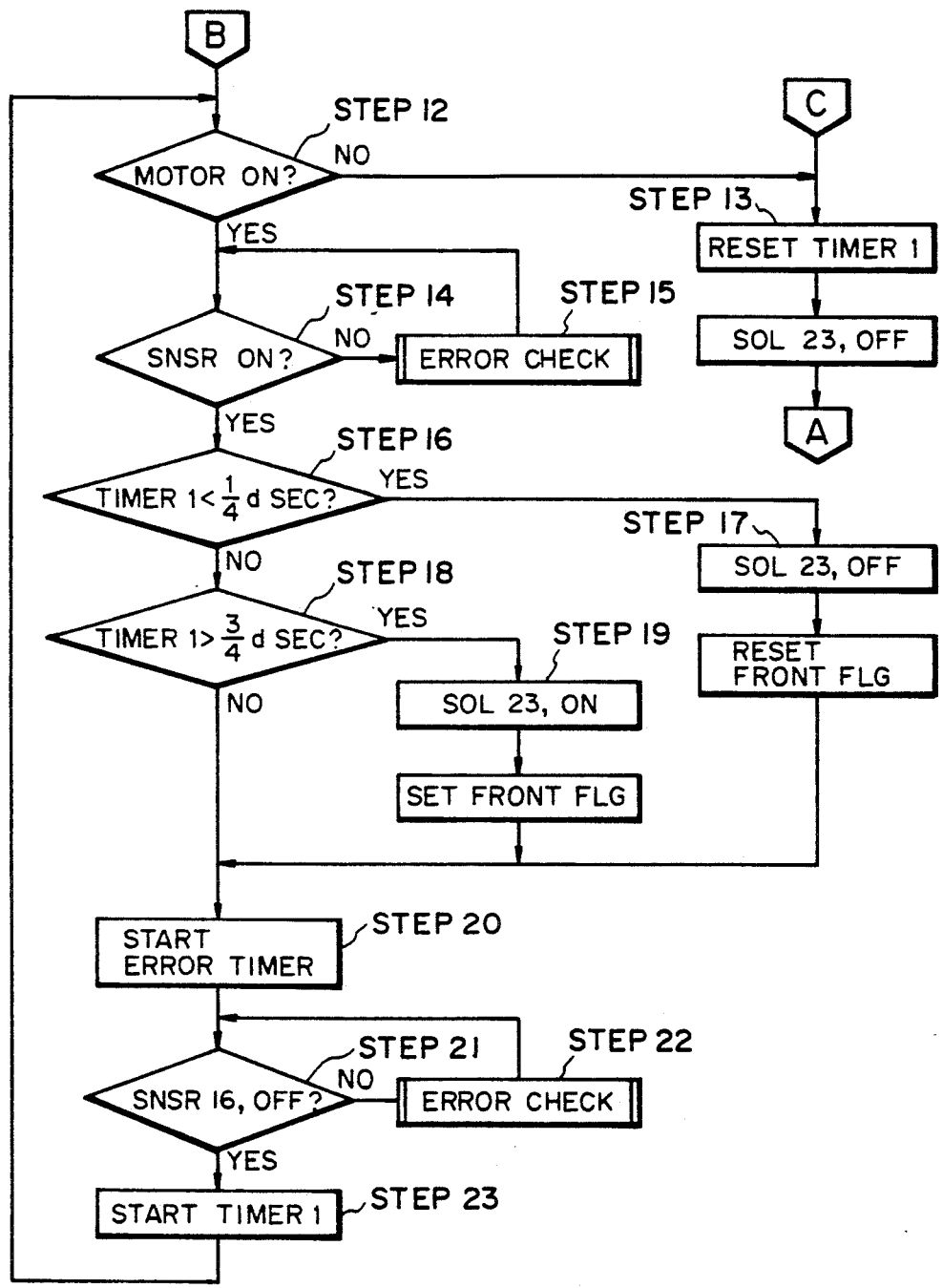
Figure 10:
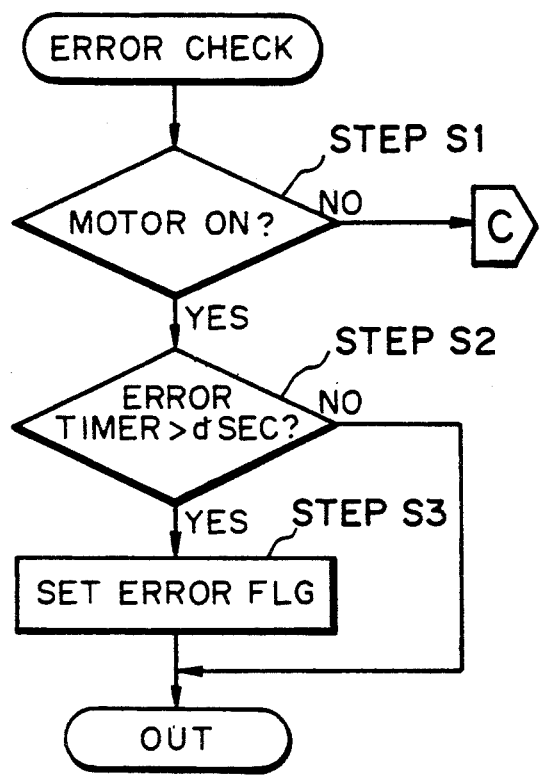

Referring to FIG. 10, the error check routine will be described. First, at step S1 a discrimination is made as to whether or not the motor 27 is energized. If so, step S2 is executed. If not, the operation proceeds to step 13 (FIG. 9). At step S2, a discrimination is made as to whether or not the content of the error timer is smaller or larger than d sec. If it is smaller, the operation skips to the outlet of this routine. If, at step S2, the error timer count is larger than d sec., step S3 is executed.

At step S3, the error flag is set, and the operation skips to the outlet of the routine.

At step 6, if the sensor 16 is actuated, step S8 is executed where the error timer is reset to zero, and also, the measurement is started. Then, step 9 is executed. At step 9, a discrimination is made as to whether the sensor 16 is deactuated or not. If it is not off, the operation proceeds to step 10 where the error check routine is executed, and the operation returns to step 9. When the sensor 16 is deactuated, the operation proceeds to step 11 where the timer count is reset to zero, and also starts to the measurement. Then, step 12 (FIG. 9) is executed.

At step 12, a discrimination is made as to whether or not the motor 27 is actuated. If so, the operation proceeds to step 14.

At step 14, a discrimination is made as to whether or not the sensor 16 is actuated. If so, the operation proceeds to step 15 where the error check routine is executed, and the operation returns to step 14. If the sensor 16 is actuated, step 16 is executed.

At step 16, a discrimination is made as to whether the count of the timer 1 is smaller than d/4 sec. or not. If so, the film 11 is deemed to have been deviated toward the front side. Then, the operation proceeds to step 17 where the solenoid 23 is deenergized to switch the lateral shifting direction to the rear side. The front flag is reset to zero, and the operation proceeds to step 20.

At step 16, if the count of the timer 1 is not smaller than d/4 sec. the operation proceeds to step 18. At step 18 a discrimination is made as to whether or not the count of the timer 1 is larger than 3 d/4 sec. If not, the operation proceeds to step 20. If it is larger, the film 11 is deemed to have been deviated toward the rear. Then, step 19 is executed by which the solenoid 23 is energized to switch the lateral shift direction to the front side. In addition, the front flag is set to 1, and the operation proceeds to step 20.

At step 20, the error timer is reset to zero, and starts measurement. Then, the operation proceeds to step 21.

At step 21, a discrimination is made as to whether or not the sensor 16 is deactuated. If it is not deactuated, the operation proceeds to step 22 where the error check routine is executed, and returns to step 21. At step S21, if the sensor 16 is deactuated, the operation proceeds to step 23 where the timer 1 is reset to zero, and start measurement. Then, the operation returns to step 12.

If the motor 27 is not actuated in the step 13, the operation proceeds to step 13 where the measurement of the timer 1 is stopped, and is reset to zero, and then the solenoid 23 is deenergized. Then, the operation returns to step 1.

Figure 11:
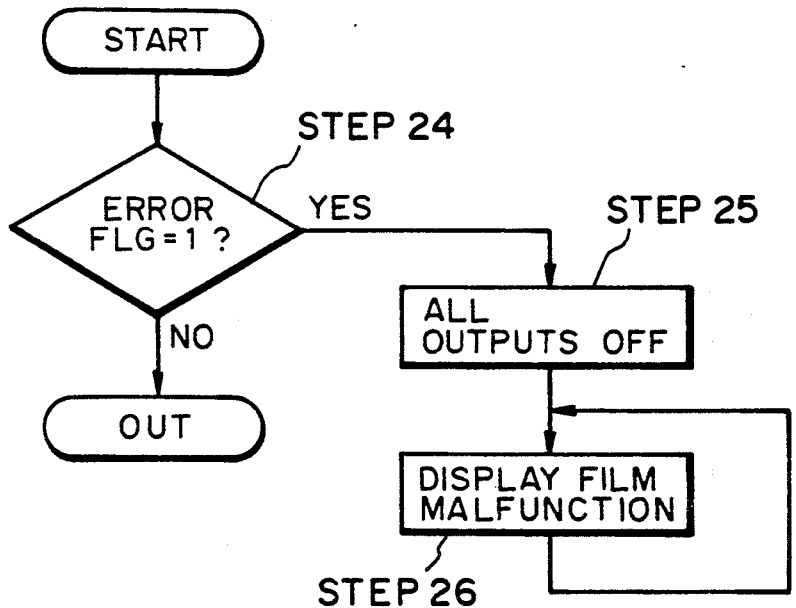

FIG. 11 is a flow chart of a film malfunction clearance program which is a part of the main program. Here, a discrimination is made at step 24 as to whether the error flag is set or not. If not, the operation skips to the outlet, and the subsequent main sequence program is executed.

If the error flag is set at step 24, the operation proceeds to step 25 where all the outputs of all of the apparatus (copying machine in this embodiment) are rendered off. Then, the operation proceeds to step 26 where the film malfunction is displayed. The step 26 is made permanent loop to prohibit execution of the main program.

As described in the foregoing, the endless film 11 of the fixing apparatus of this embodiment is controlled by the solenoid 23 upon the rotation of the motor. At this time, the solenoid 23 is controlled in accordance with the content of the non-volatile RAM which stores the controlling lateral shift direction immediately before the past stoppage. Then, during the motor rotation, when the sensor 16 is not actuated, the switching to the off-state is awaited. And, when the sensor 16 is off, the switching to the on-stage and subsequent switching to the off-state is awaited. By doing so, the timing at which the output of the film position sensor 16 changing from the on-state to the off-state is detected. This is a end of the initial setting. Then, the off-duration of the sensor 16 until the switching to the on-state is counted t detect the position of the film.

Since the control of the film 11 is not possible until the initial counting of the off-duration of the sensor 16, the lateral shifting direction is set to be equal to the previous direction by which the abnormal lateral shifting of the film is prevented during the uncontrollable period. Subsequently, the off-duration of the sensor 16 from the switching of the sensor 16 from the on-state to the off-state to the switching thereof from the off-state to the on-state is counted.

The off-duration is made within a predetermined range (in this embodiment between d/4 sec. and 3d/4 sec.) by switching the lateral shifting direction, by which the film position is controlled to be within a predetermined range.

In this manner, an output of a single sensor 16 is enough to detect two positions of the film reversing direction, in this embodiment.

The movement distance in the lateral direction of the endless film defined by the duration d/4 sec. and 3d/4 sec. is smaller than the amount of inclined cut $\Delta L$ of the endless film. When the sensor 16 continues the on- or off-state for a predetermined duration (d sec. in this embodiment) which is larger than the time period d/4 and 3d/4 corresponding to the film reversing positions, it is deemed that a malfunction occurs, and the apparatus is stopped, by which the damage of the film and the damage of the fixing apparatus can be prevented beforehand.

In this embodiment, the output of the sensor 16 may be used not only to detect the reversing positions of the endless film but also to detect the abnormal position or positions beyond the controllable range of the endless film.

In this embodiment, the sensor 16 is of a transparent type, but it may be of a microswitch type or a reflection type photosensor.

Figure 12:
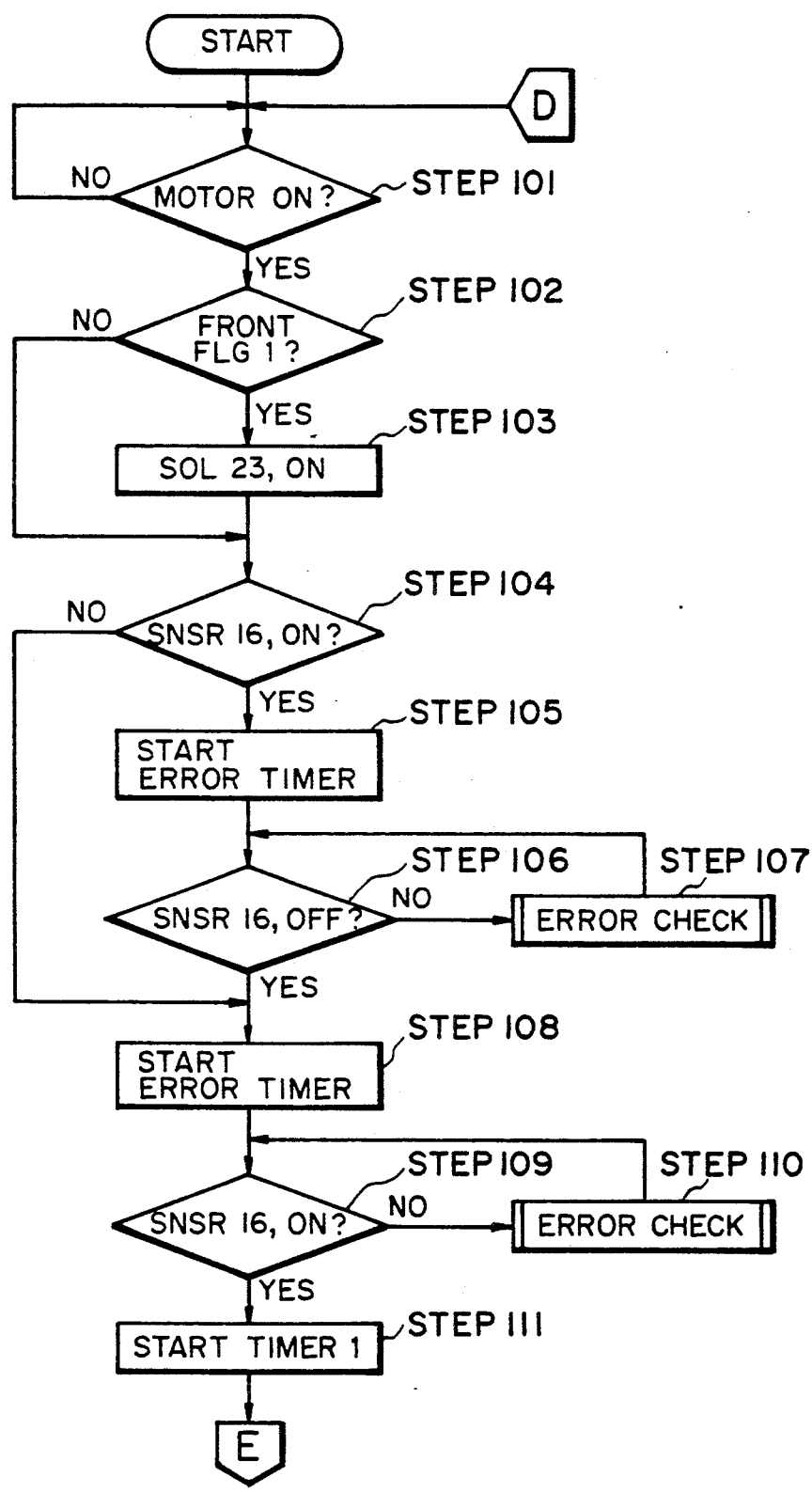
FIG. 12 and 13 are flow charts of a lateral shift control according to a further embodiment.
Figure 13:
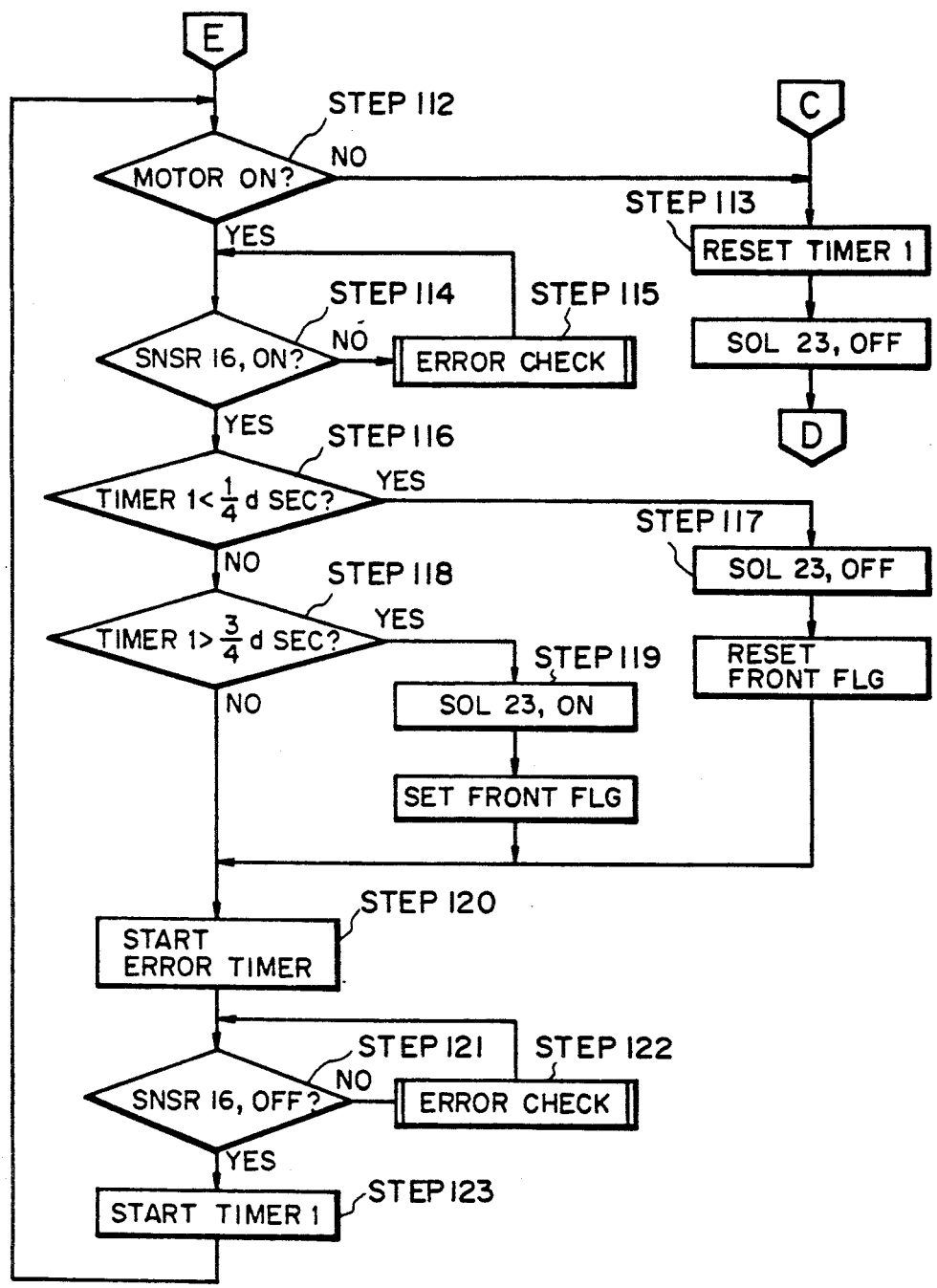

Referring to FIGS. 12 and 13, there is shown a flow chart of a film lateral shift control program according to a second embodiment. The other structures are the same as in the first embodiment, and therefore, the description thereof is omitted for simplicity.

In FIG. 12, after the start, the discrimination is made as to whether the motor 27 is actuated or not at step 101.

If so, step 104 is executed. If not, the operation returns to step 101 where the actuation of the motor 27 is awaited.

At step 102, a discrimination is made as to whether or not the film has been controlled to shift toward the front. More particularly, the content of the non-volatile RAM at a predetermined address in the microcomputer 26 is set to be a front flag, and if the memory is 1, that is, the immediately previous control was toward the front side, the step 103 is executed by which the solenoid 23 is actuated to set the control to the front side shifting. Then, the operation proceeds to step 104. If, at step 102, the front flag is zero, it means that the immediately previous control was toward the rear side, and therefore, the operation proceeds directly to step 104.

At step 104, a discrimination is made as to whether or not the sensor 16 is actuated. If not, step 108 is executed. If so, the operation proceeds to step 105.

At step 105, the count of the error timer is reset to zero, and the counting is started. Then, the operation proceeds to step 106.

At step 106, a discrimination is made as to whether or not the sensor 16 is deactuated or not. If it is not deactuated, step 107 is executed. At step 107, the error check routine is executed, and then, the operation returns to step 106.

Here, the content of the error check routine is the same as in the first embodiment (FIG. 10).

Then, if, at step 106, the sensor 16 is deactuated, the operation proceeds to step 108 where the count of the error timer is reset to zero, and the counting is started, and then, the operation proceeds to step 109. At step 109, a discrimination is made as to whether or not the sensor 16 is actuated or not. If not, step 110 is executed by which the error check routine is executed, and the operations returns to step 109. If the sensor 16 is actuated, the operation proceeds to step 111 where the count of the timer 1 is reset to zero, and the counting is started. Then, the operation proceeds to step 112.

At step 112, a discrimination is made as to whether or not the motor 27 is actuated. If so, step 114 is executed.

At step 114, a discrimination is made as to whether or not the sensor 16 is deactuated or not. If not deactuated, step 115 is executed by which the error check routine is executed, and the operation proceeds to step 114. If it is deactuated, step 116 is executed. At step 116 a discrimination is made as to whether or not the count of the timer 1 is smaller than d/4 sec. If it is smaller, the film 11 is deemed as having been shifted toward the front, and therefore, the operation proceeds to step 117 where the solenoid 23 is deactuated to switch the shifting direction of the film 11 toward the rear side, and in addition, the front flat is reset to zero. Then, the operation proceeds to step 120.

If, at step 116, the count of the timer 1 is not smaller than d/4 sec., the operation proceeds to step 118.

At step 118, a descrimination is made as to whether or not the count of the timer 1 is larger than 3d/4 sec. If not, the operation proceeds to step 120. If larger, the film is deemed as having been shifted to the rear side, and therefore, the operation proceeds to step 119 where the solenoid 32 is actuated to switch the lateral shifting direction to the front side, and in addition, the front flag is set to 1. Then, the operation proceeds to step 120.

At step 120, the count of the error timer is reset to zero, and the counting is started. Then, the operation proceeds to step 121.

At step 121, a discrimination is made as to whether or not the sensor 16 is actuated. If it is not actuated, the operation proceeds to step 122 where the error check routine is executed, and the operation returns to step 121.

If, at step 121, the sensor 16 is actuated, the operation proceeds to step 123 where the count of the timer 1 is reset to zero, and the counting is started, and then the operation returns to step 112.

If, at step 112, the motor 27 is not actuated, step 113 is executed where the counting of the timer 1 is stopped, and the count is reset to zero, and then the solenoid 23 is deenergized. Then, the operation returns to step 101.

Since the error check routine and the film malfunction clearance program which is a part of the main program are the same as with the first embodiment, and therefore, the description thereof is omitted for the sake of simplicity.

As described in the foregoing, at the start of the motor rotation, the solenoid 23 is controlled in accordance with the content of the non-volatile RAM storing the immediately previous control direction. Then, during the motor rotation, if the sensor 16 is not actuated, the actuation thereof is awaited. If the state of the sensor 16 is on, the switching to the off-state, the switching to the on-state and the subsequent switching to the on-state, are awaited. By detecting the timing at which the output of the film position sensor 16 switches from the off-state to the on-state, the initial setting is completed.

Then, by measuring the on-duration of the sensor 16 from the next actuation of the sensor 16 to the switching to the off-state, the position of the film 11 is first detected. Until the first detection of the on-duration of the sensor 16, the control of the film 11 is disabled. Therefore, during the uncontrollable period, the lateral shifting direction is selected to be the same as the immediately previous direction of the control, by which the film is prevented from abnormally deviated during the uncontrollable period. Thereafter, the on-duration of the sensor from the switching of the photosensor 16 from the off-state to the on-state to the switching from the on-state to the off-state is counted, and the film shifting direction is switched so that the on-duration is within a predetermined range (between d/4sec. and 3d/4 sec. in this embodiment). By doing so, the film position is maintained within a controllable range. If the sensor 16 continues to be on or off for a period exceeding a predetermined period (d sec. in this embodiment), it is deemed that a film malfunction occurs, and the apparatus is stopped. By doing so, damage to the film and/or the fixing apparatus can be prevented beforehand.

Figure 15A:
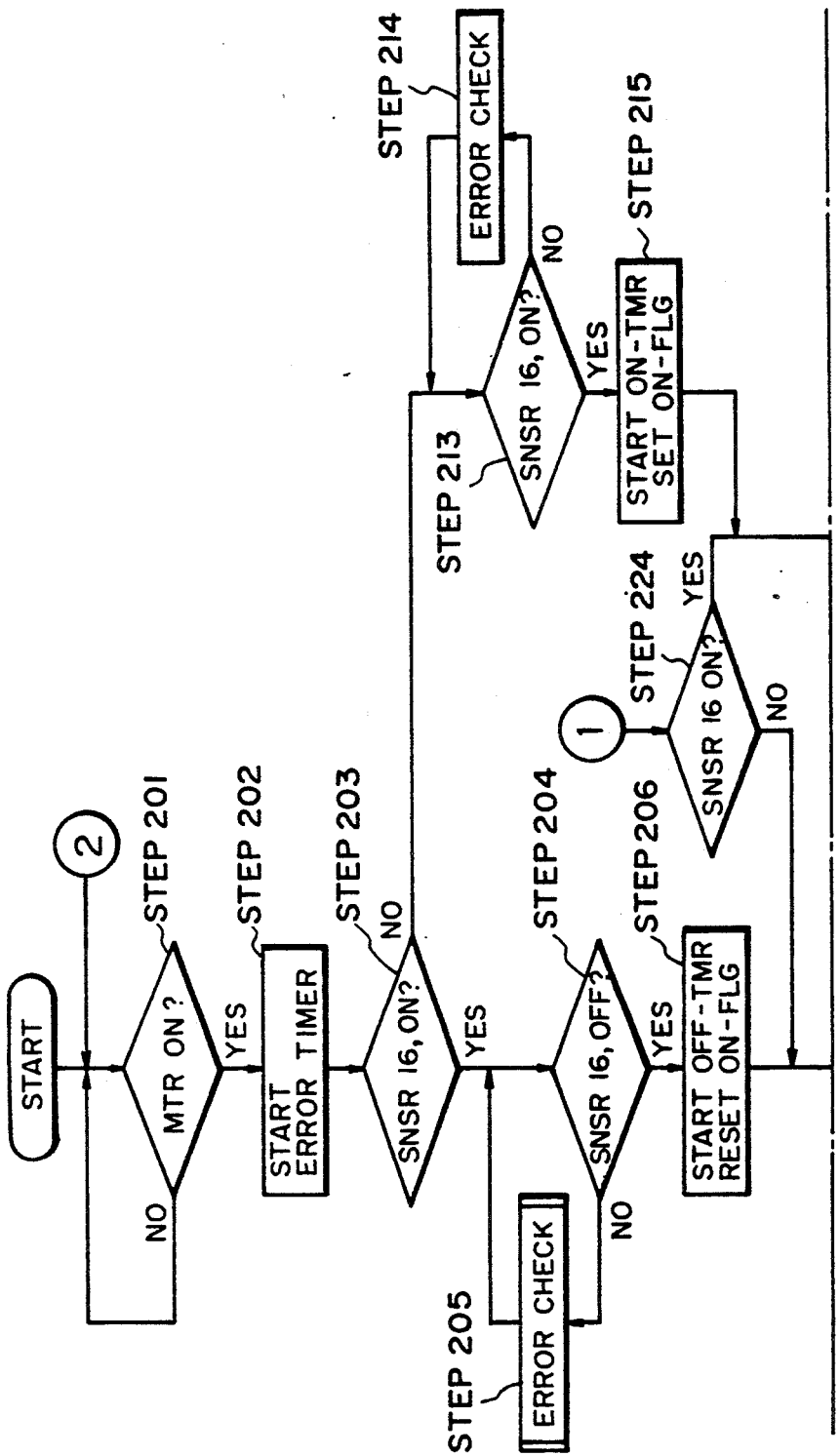

FIGS. 14 and 15 illustrate a third embodiment. In this embodiment, a monostable latching solenoid 31 is used in place of the solenoid 23 of the first embodiment.

FIG. 14 shows the electric control system. A microcomputer 32 has an input terminal IN1 to which the photosensor 16 for detecting the position of the film 11 is connected, and output terminals OUT1 and OUT2 to which the monostable latching solenoid 31 (latching solenoid) is connected. It is a double coil type, and the coil for attraction is connected to the terminal OUT1 and the releasing coil is connected to the terminal OUT2. The microcomputer has another terminal OUT3 which produces a rotation control signal for the motor for driving the fixing apparatus.

To the VDD terminal, the voltage source of +5 V is connected, and the GND terminal is grounded.

The microcomputer further comprises, although not shown, terminals for the outer input and output signals for the copying machine using the fixing apparatus of this embodiment. In the microcomputer 32, there are ROM and RAM or the like in which the sequential operation program is contained for the copying operation of the copying machine.

A description will be provided as to the latching solenoid 31. The solenoid has a permanent magnet When the attraction coil is supplied with voltage to pull the plunger, the plunger is retained by the permanent magnet, and therefore, the voltage application to the attraction coil is not required. When the voltage is applied to the releasing coil, the magnetic force for neutralizing the magnetic force of the permanent magnet is produced, and therefore, the retention of the attraction is released by the compression spring 22 as shown in FIG. 1. In this case, too, the voltage application to the releasing coil after the release is not required. Accordingly, pulse voltage application is sufficient to the latching solenoid. In this embodiment, the pulse voltage has a pulse width of 100 ms.

FIG. 15 is a flow chart of a film lateral shift control program of this embodiment. The program is contained in the ROM in the microcomputer 32 and is accessed at regular intervals or desired by the main sequence program.

After the start, a discrimination is made as to whether or not the motor 27 is actuated, at step 201. If so, the operation proceeds to step 202. If not, the operation returns to step 201 where actuation of the motor 27 is awaited.

At step 202, the count of the error timer is reset, and the counting is started. Then, the operation proceeds to step 203.

At step 203, the discrimination is made as to whether or not the sensor 16 is actuated. If so, the operation proceeds to step 204.

At step 204, a discrimination is made as to whether or not the sensor 16 is deactuated. If not deactuated, the operation proceeds to step 205.

At step 205, the error check routine is executed, and the operation proceeds to 204.

The contents of the error check routine are the same as with the first embodiment, and therefore, the description is omitted for simplicity.

If the sensor 16 is deactuated at step 204, operation proceeds to step 206 where the on-flag is reset to zero, and the off-timer is reset to zero, and the counting is started. Then, the operation proceeds to step 207.

At step 207, a discrimination is made as to whether or not the on-flag is set. If so, the operation proceeds to step 208 where the on-flag is reset to zero, and the operation proceeds to step 210.

At step 210, a discrimination is made as to whether or not the count of the on-timer is larger than 3d/4 sec. If it is smaller, the operation proceeds to step 211. If it is larger, the film 11 is deemed as having been shifted to the front side, and therefore, the operation proceeds to step 212 where the attraction releasing drive signal for the solenoid 31 is produced, and the shifting direction of the film 11 is switched to the rear, and the operation proceeds to step 211.

At step 211, the count of the off-timer is reset to zero, and the counting is started. Then, the operation proceeds to step 220.

If the on-flag is not set at step 207, the operation proceeds to step 209 where the error check routine is executed, and the operation proceeds to step 222.

If the sensor 16 is not actuated at step 203, the operation proceeds to step 213. At step 213, a discrimination is made as to whether or not the sensor 16 is actuated. If not actuated, the operation proceeds to step 214 where the error check routine is executed, and the operation returns to step 213. When the sensor 16 is actuated, the operation proceeds to step 215 where the on-flag is set to 1, and the on-timer is reset to zero, and the counting is started. Then, the operation proceeds to step 216.

At step 216, a discrimination is made as to whether the on-flag is reset or not. If it is reset, the operation proceeds to step 217 where the on-flag is set to 1, and the operation proceeds to step 219.

At step 219, a discrimination is made as to whether or not the count of the off-timer is larger than 3d/4 sec. If it is smaller, step 220 is executed. If it is larger, the film is deemed as having been shifted to the rear side, and therefore, the operation proceeds to step 221 where the attraction drive signal for the solenoid 31 is produced to switch the film 11 shifting direction toward the front side, and the operation proceeds to step 220.

At step 220, the count of the on-timer is reset to zero, and the counting is started. Then, step 220 is executed. If, at step 216, the on-flag is set to 1 step 218 is executed where the error check routine is executed, and the operation proceeds to step 222.

At step 222, a discrimination is made as to whether or not the motor 27 is actuated. If so, step 224 is executed. At step 224, a discrimination is made as to whether or not the sensor 16 is actuated. If so, step 216 is executed. If it is not actuated, step 207 is executed to repeat the above-described processing steps.

If, at step 222, the motor 27 is deactuated, step 223 is executed.

At step 223, the on-timer and the off-timer are reset, and the operation proceeds to step 201 where the actuation of the motor 27 is awaited.

The error check routine and the film malfunction clearance program which is a part of the main program are the same as with the first embodiment, and therefore, the description is omitted for simplicity.

As described in the foregoing, if the sensor 16 is actuated upon start of the motor rotation, the timing at which it is switched to off-state is detected. If the sensor 16 is not actuated, the timing at which it is switched to the on-state is detected. Thus, the initial setting is completed. Then, the off-duration of the sensor 16 from the switching of the sensor 16 from the off-state to the on-state and the on-duration from the switching to the on-state to the switching to the off-state, by which the position of the film 11 is first detected.

Thus, until the first detections of the on-duration or off-duration, the film 11 position control is not possible. However, the latching solenoid 31 is set to shift the film in the direction is the same as the direction selected immediately beforehand. Therefore, the abnormal deviation of the film during the uncontrollable period can be prevented.

Thereafter, the off-duration of the sensor from the switching from the on-state to the off-state to the switching from the off-state to the on-state, and the on-duration from the switching from the off-state to the on-state to the switching from the off-state to the on-state, are measured, and the film shifting direction is switched so that the off-duration and on-duration are within the predetermined period (3d/4 sec. in this embodiment). Therefore, the film position is controlled to be within a predetermined controllable range.

If the sensor 16 continues to be on or off for a period exceeding a predetermined period (d sec. in this embodiment), it is deemed that a film malfunction occurs. Therefore, the apparatus is stopped, by which the damage of the film and/or the fixing apparatus can be prevented beforehand.

Since the latching solenoid is used, only the pulse voltage is enough to actuate or deactuated the solenoid, and therefore, the power consumption can be saved.

According to the present invention, as described in the foregoing, an output of a single sensor is effective to detect plural positions of the endless belt. In addition, the necessity for the additional sensor for the abnormal position can be eliminated.

Referring to FIG. 16, another embodiment will be described wherein the solenoid 23 and the sensor 16 are disposed at the same side. The sheet passage side of the masked portion 3 is parallel with the rotational direction of the endless film 11, and the width of the masking is changed.

Figure 17A:
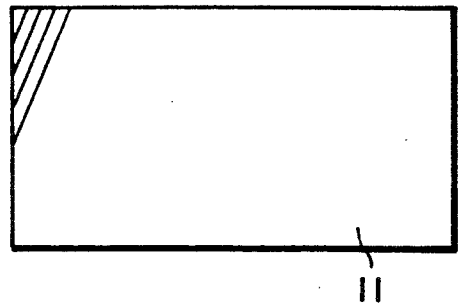
FIGS. 17A and 17B are top plan view of an image fixing film.
Figure 17B:
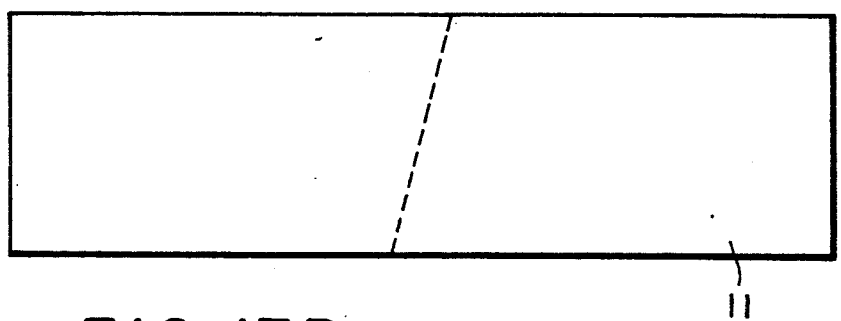

FIGS. 17A and 17B shows a configuration of the endless film. In FIG. 17A, only a part of the film is cut for the purpose of film position detection, and in FIG. 17B, the cut portion exists over the entire fixing film 11. In FIG. 17A configuration, a part of the material will be wasted. However, in FIG. 17B, it will be understood that the material is not wasted, since both sides are uniform and usable.

In the foregoing embodiment, the on-duration or off-duration of the sensor 16 is counted by a timer, by which the position of the endless film is detected.

Figure 18:
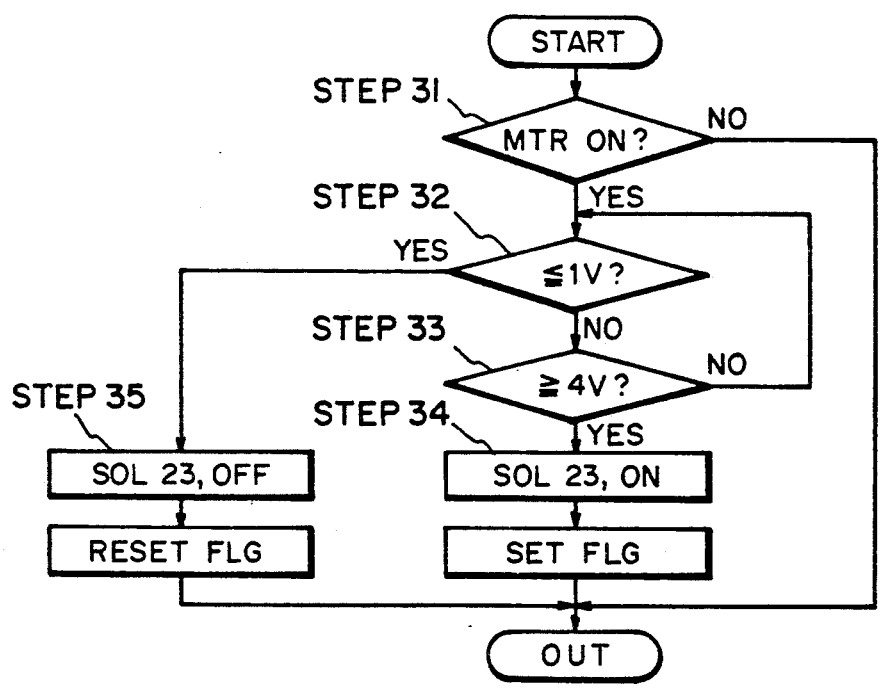
FIG. 18 is a flow chart according to a further embodiment of the present invention.

FIG. 18 shows another embodiment wherein the output of the sensor 16 is time-integrated, and is converted to a voltage. The operation of this embodiment will be described. After the start, a discrimination is made as to whether motor is actuated or not at step 31.

If the motor is actuated, the operation proceeds to step 32. If the motor is not actuated, the shift control is not effected, and the operation skips to the outlet (step 36), and the operation returns to the main program.

At step 32, the time-integrated voltage of the photoreceptor side of the photosensor. The result of discrimination as to whether or not it is not more than 1 V, is supplied to a predetermined address of RAM of the microprocessor. Then, a comparison is made between it and the setting of the microprocessor. If it is not more than 1 V, the operation proceeds to step 35. If it is more than 1 V, the next step 33 is executed. Here, if it is higher than or equal to 4 V, step 34 is executed. If not, the operation returns to step 32.

At step 34, the solenoid 23 is energized, and the flag is set, and the operation proceeds to the outlet (step 36). When the Y-side is selected at step 32, step 35 is executed where the solenoid 23 is deenergized, and the flat is reset. Then, the operation proceeds to the outlet (step 36), and returns to the main program.

In the foregoing embodiment, the upper and lower limit of the photosensor is set to be 1 V and 4 V. They may be other values.

Figure 19:
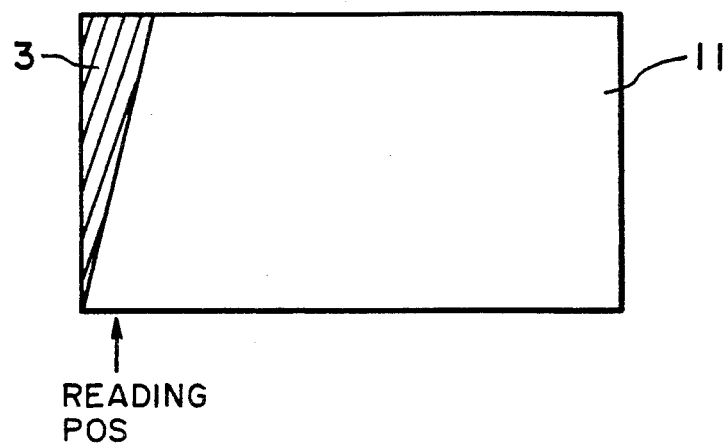
FIGS. 19 and 20 are top plan views of another example of the fixing film.

FIG. 19 shows a configuration of the fixing film according to a further embodiment. In this embodiment, the hatched portion 26 is treated by coating, printing, etching, impressing, painting or the like to provide film abnormal detection. Thus, the film 11 position detection is permitted by providing inclined nature at least at one end of the film where the photosensor 16 senses. In these examples, only one paper is provided, but plural papers can be formed wherein total on-duration and/or off-duration is counted.

Figure 20:
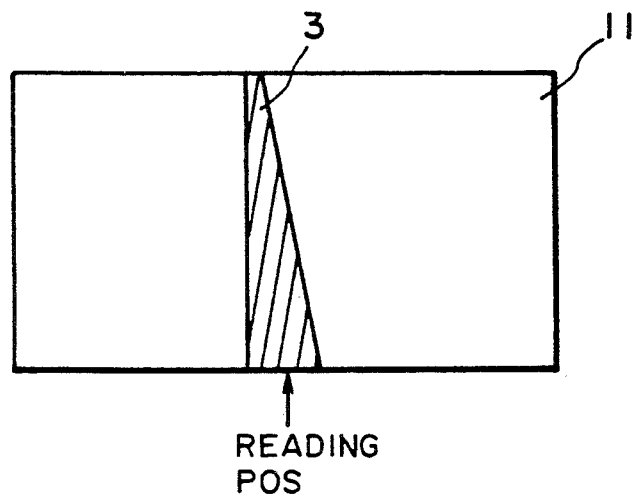

FIG. 20 shows the configuration of the fixing film 11 according to a further embodiment. In this embodiment, a inclined portion 3 is provided outside the end of the fixing film to permit the abnormal position of the film to be detected. In this embodiment, it is preferable that the photosensor is of reflection type.

Figure 21:
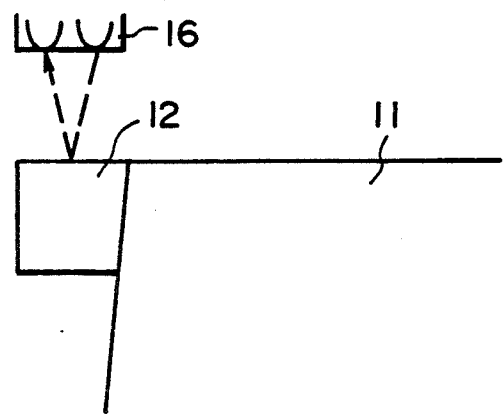
FIG. 21 is a partial enlarged view of a further embodiment.

FIG. 21 shows a further embodiment. In this embodiment, a means for permitting the sensing is provided on the surface of the follower roller 12. When the end of the fixing film 11 comes to the end shown in FIG. 21, the film 11 which is masked to block the light. Thus, the shifting to that side can be detected.

The treatment described in conjunction with FIG. 19 may be effected on the surface of the follower roller 12, with the same advantageous effects.

In the foregoing embodiments, a thin film endless belt has been used in order to reduce the waiting period of the fixing apparatus, but the lateral shift control of the endless belt is not limited to this, but is applicable to a thick endless belt.

In the foregoing embodiment, the sensor directly detects the endless film, but it is a possible alternative that a lever movable in accordance with the lateral shift of the endless film may be used in which the sensor detects the displaceable lever.

While the invention has been described with reference to the structures disclosed herein, it is not confined to the details set forth and this application is intended to cover such modifications or changes as may come within the purposes of the improvements or the scope of the following claims.

What is claimed is:

1. An image heating apparatus comprising:
    a heater;
    an endless belt movable together with a supporting material supporting an image, wherein the image is heated by heat from said heater through the endless belt;
    lateral shifting means for applying a lateral force to said endless belt in a first direction and a second direction which is opposite from the first direction;
    detecting means for detecting the position of the endless belt; and
    switching means for switching the direction of the force of said lateral shifting means in accordance with an output of said detecting means,
    wherein said detecting means includes a sensing element, and wherein said switching means effects its switching action in accordance with a sensing time of said sensing element.

2. An apparatus according to claim 1, further comprising a pressing member for pressing the supporting material to said heater and said endless belt.

3. An apparatus according to claim 1, wherein said endless belt has a thickness smaller than 100 microns.

4. An apparatus according to claim 1, wherein said sensing element senses and end of said endless belt.

5. An apparatus according to claim 1, wherein said sensing element includes a photosensor.

6. An apparatus according to claim 5, wherein said endless belt blocks light.

7. An apparatus according to claim 1, wherein the sensing time changes in accordance with the position of said endless belt in the direction of lateral shift.

8. An apparatus according to claim 7, wherein when the sensing time is longer than a first predetermined period, said switching means effects its switching operation from the first direction to the second direction, and when the sensing time is shorter than a second predetermined period, said switching means effects its switching operation from the second direction to the first direction.

9. An apparatus according to claim 8, wherein the first predetermined period is different from the second predetermined period.

10. An apparatus according to claim 1, wherein said sensing element directly detects said endless belt.

11. An apparatus according to claim 1, further comprising error checking means for discriminating a malfunction when the sensing time is larger than a predetermined period.

12. An apparatus according to claim 11, further comprising stopping means for stopping said apparatus when said error checking means discriminates a malfunction.

13. An apparatus according to claim 11, further comprising display means for displaying data indicating an occurrence of a malfunction of said endless belt when said error checking means discriminates the malfunction.

14. An apparatus according to claim 2, wherein said sensing element is provided only for one lateral side of said endless belt.

15. A lateral shift control apparatus for an endless belt, comprising:
lateral shifting means for applying a lateral force to the endless belt in a first direction and a second direction which is opposite from the first direction;
detecting means for detecting the position of the endless belt; and
switching means for switching the direction of the force of said lateral shifting means in accordance with an output of said detecting means,
wherein said detecting means includes a sensing element, and wherein said switching means effects its switching action in accordance with a sensing time of said sensing element.

16. An apparatus according to claim 15, wherein said sensing element senses an end of the endless belt.

17. An apparatus according to claim 15, wherein said sensing element includes a photosensor.

18. An apparatus according to claim 17, wherein the endless belt blocks light.

19. An apparatus according to claim 15, wherein the sensing time changes in accordance with the position of the endless belt in the direction of lateral shift.

20. An apparatus according to claim 19, wherein when the sensing time is longer than a first predetermined period, said switching means effects it switching operation from the first direction to the second direction, and when the sensing time is shorter than a second predetermined period, said switching means effects it switching operation from the second direction to the first direction.

21. An apparatus according to claim 20, wherein the first predetermined period is different from the second predetermined period.

22. An apparatus according to claim 15, wherein said sensing element directly detects the endless belt.

23. An apparatus according to claim 15, further comprising error checking means for discriminating a malfunction when the sensing time is larger than a predetermined period.

24. An apparatus according to claim 23, further comprising stopping means for stopping said apparatus when said error checking means discriminates the malfunction.

25. An apparatus according to claim 23, further comprising display means for displaying data indicating an occurrence of a malfunction of the belt when said error checking means discriminates the malfunction.

26. An apparatus according to claim 16, wherein said sensing element is provided only for one lateral side of the endless belt.

27. An endless belt driving apparatus comprising:
an endless belt;
lateral shifting means for applying to said belt a lateral shifting force;
detecting means for detecting the position of the endless belt; and
switching means for switching a direction of the force of said lateral shifting means in accordance with an output of said detecting means,
wherein said endless belt includes an inclined portion which is inclined with respect to a plane normal to a generating line thereof, and wherein said detecting means detects the inclined portion.

28. An apparatus according to claim 27, wherein said detecting means detects the position of the lateral end of said endless belt at one side thereof, and wherein said switching means alternately switches the shifting direction in accordance with the detection of said detecting means.

29. An apparatus according to claim 27, wherein said endless belt has the inclined portion only at one lateral end portion.

30. An apparatus according to claim 27, wherein said endless belt has a later end edge inclined along its entire circumference.

31. An apparatus according to claim 27, wherein said detecting means comprises a photosensor.

32. An apparatus according to claim 31, wherein said endless belt blocks light.

33. An apparatus according to claim 27, wherein said switching means switches the direction of the force of said lateral shifting means in accordance with sensing time of said detecting means.

34. An apparatus according to claim 33, said switching means compares the sensing time with a predetermined time period to control said lateral shifting means.

35. An apparatus according to claim 34, wherein said endless belt has a width which is different at different circumferential positions thereof, and wherein a lateral deviation of said endless belt is smaller than the difference between the maximum width and the minimum width of said endless belt.

36. An apparatus according to claim 34, further comprising error checking means for discriminating a malfunction in accordance with the sensing time.

37. An apparatus according to claim 36, further comprising stopping means for stopping said apparatus when said error checking means discriminates a malfunction.

38. An apparatus according to claim 36, further comprising display means for displaying data indicating an occurrence of a malfunction of said endless belt when said error checking means discriminates the malfunction.

39. An apparatus according to claim 27, wherein said detecting means is provided only for one lateral end of said endless belt.

40. An image heating apparatus comprising:
a heater;
an endless belt movable together with a supporting material supporting an image, wherein the image is heated by heat from said heater through said endless belt;
lateral shifting means for applying to said endless belt a lateral shifting force;
detecting means for detecting the position of the endless belt; and
switching means for switching a direction of the force of said lateral shifting means in accordance with an output of said detecting means,
wherein said endless belt includes an inclined portion which is inclined with respect to a plane normal to a generating line thereof, and wherein said detecting means detects the inclined portion.

41. An apparatus according to claim 40, further comprising a pressing member for pressing the supporting material to said heater and said endless belt.

42. An apparatus according to claim 40, wherein said endless belt has a thickness smaller than 100 microns.

43. An apparatus according to claim 40, wherein said detecting means senses an end of the endless belt.

44. An apparatus according to claim 40, wherein said detecting means includes a photosensor.

45. An apparatus according to claim 44, wherein said endless belt blocks light.

46. An apparatus according to claim 40, wherein said detecting means further comprises a sensing element, wherein said switching means effects its switching action in accordance with a sensing time of said sensing element, wherein the sensing time changes in accordance with the position of said endless belt in the direction of the lateral shift.

47. An apparatus according to claim 46, wherein when the sensing time is longer than a first predetermined period, said switching means effects it switching operation from a first direction to a second direction, and when the sensing time is shorter than a second predetermined period, said switching means effects it switching operation from the second direction to the first direction.

48. An apparatus according to claim 47, wherein the first predetermined period is different from the second predetermined period.

49. An apparatus according to claim 40, wherein said detecting means further comprises a sensing element, wherein said switching means effects its switching action in accordance with a sensing time of said sensing element, wherein said sensing element directly detects said endless belt.

50. An apparatus according to claim 40, wherein said detecting means further comprises a sensing element, wherein said switching means effects its switching action in accordance with a sensing time of the sensing element, said apparatus further comprising error checking means for discriminating a malfunction when the sensing time is larger than a predetermined period.

51. An apparatus according to claim 50, further comprising stopping means for stopping said apparatus when said error checking means discriminates the malfunction.

52. An apparatus according to claim 51, further comprising display means for displaying data indicating a occurrence of a malfunction of said belt when said error checking means discriminates the malfunction.

53. An apparatus according to claim 51, wherein said detecting means includes a sensing element, and wherein said switching means effects its switching action in accordance with a sensing time of said sensing element, wherein said sensing element is provided only for one lateral side of said belt.

* * * * *

UNITED STATES PATENT AND TRADEMARK OFFICE
CERTIFICATE OF CORRECTION

PATENT NO. : 5,157,444

DATED : October 20, 1992

INVENTOR(S) : MORI et al.

It is certified that error appears in the above-identified patent and that said Letters Patent is hereby corrected as shown below:

COLUMN 1
Line 50, "sensor" should read --sensors--.
Line 51, "lateral," should read --lateral--.

COLUMN 2
Line 42, "view" should read --views--.

COLUMN 6
Line 46, "26 this" should read --26. This--.

COLUMN 8
Line 23, "a" should read --an--.
Line 25, "counted t" should read --counted to--.

COLUMN 12
Line 30, "1" should read --1,--.

COLUMN 13
Line 14, "deactuated" should read --deactuate--.
Line 27, "shows" should read --show--.
Line 64, "They" should read --There--.

UNITED STATES PATENT AND TRADEMARK OFFICE
CERTIFICATE OF CORRECTION

PATENT NO. : 5,157,444

DATED : October 20, 1992

INVENTOR(S) : MORI et al.

It is certified that error appears in the above-identified patent and that said Letters Patent is hereby corrected as shown below:

COLUMN 14
Line 18, "which" should be deleted.

COLUMN 18
Line 31, "claim 51," should read --claim 50,--.
Line 32, "a" should read --an--.
Line 35, "claim 51," should read --claim 41--.

Signed and Sealed this

Twenty-third Day of November, 1993

Attest:

BRUCE LEHMAN

Attesting Officer

Commissioner of Patents and Trademarks